(12) United States Patent
Honda et al.

(10) Patent No.: US 7,553,468 B2
(45) Date of Patent: Jun. 30, 2009

(54) METHOD FOR PRODUCING SOLID PRODUCT

(75) Inventors: Shuuichi Honda, Kumamoto (JP); Toru Tanaka, Kumamoto (JP); Satoshi Hayashida, Kumamoto (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 12/044,656

(22) Filed: Mar. 7, 2008

(65) Prior Publication Data

US 2008/0226531 A1 Sep. 18, 2008

(30) Foreign Application Priority Data

Mar. 12, 2007 (JP) .............................. 2007-061207

(51) Int. Cl.
*C01B 33/02* (2006.01)
*B01J 19/00* (2006.01)

(52) U.S. Cl. ...................... 423/350; 423/349; 423/351; 438/488; 117/87; 117/88; 117/89; 117/104; 117/200; 427/250; 427/252; 427/255.11; 427/255.18; 427/255.23

(58) Field of Classification Search ......... 423/349–351; 438/488; 117/87–95, 103, 104, 200; 427/250, 427/252, 255.11, 255.18, 255.23
See application file for complete search history.

(56) References Cited

FOREIGN PATENT DOCUMENTS

| JP | 64025922 | | 1/1989 |
|----|----------|---|--------|
| JP | 04365806 | | 12/1992 |
| JP | 05139891 A | * | 6/1993 |
| JP | 08246001 | | 9/1996 |
| JP | 2000345218 | | 12/2000 |
| JP | 2003034519 | | 2/2003 |
| JP | 2003342016 | | 12/2003 |
| JP | 2004196642 A | * | 7/2004 |

* cited by examiner

*Primary Examiner*—Jerry Lorengo
*Assistant Examiner*—Carlos Barcena
(74) *Attorney, Agent, or Firm*—J.C. Patents

(57) ABSTRACT

Provided is a production method for producing a solid product by a reaction of gaseous raw materials with a plurality of components including a step of conducting the reaction using a reactor disposed in a vertical direction; a step of feeding the gaseous raw materials with a plurality of components from the upper part of the reactor; a step of, in the lower part of the reactor, forming a seal gas layer composed of a gas having a high density and fed continuously from the lower part of the reactor; a step of discharging an exhaust gas containing a by-product gas generated by the reaction and unreacted gaseous raw materials from somewhere in the upper part of the formed seal gas layer; and a step of accommodating a solid product in the seal gas layer of the lower part.

13 Claims, 3 Drawing Sheets

METHOD FOR PRODUCING SOLID PRODUCT

CROSS-REFERENCE TO RELATED APPLICATION

This application claims the priority benefit of Japan application serial no. JP2007-061207, filed Mar. 12, 2007. All disclosure of the Japan application is incorporated herein by reference.

BACKGROUND OF THE INVENTION

1. Field of the Invention

The present invention relates to a method and an apparatus for producing a solid product with a high purity using a reaction of gaseous raw materials with a plurality of components.

2. Description of Related Art

As a technique for producing a solid product using a reaction of gaseous raw materials with plurality of components, there is known a technique by which a metal with a high purity is produced by a gas phase reaction of a metal chloride gas and a reducing agent gas.

For example, there are disclosed a technique for producing ultrafine nickel powder by a gas phase reduction of a nickel chloride gas with a hydrogen gas (for example, see Patent documents 1 and 2) and a technique for producing nickel, copper or silver powder by a gas phase reduction of a nickel, copper or silver chloride gas with a hydrogen gas or a hydrogen sulfide gas (for example, see Patent document 3).

Further, there is indicated a technique of gas phase reduction of a gallium chloride gas with a vapor of zinc or other metals (for example, see Patent document 4), and furthermore, there is disclosed a method for producing polycrystalline silicon by a gas phase reduction of a silicon tetrachloride ($SiCl_4$) gas with a metal reducing agent such as a zinc gas (for example, see Patent documents 5 and 6).

In particular, polycrystalline silicon with a high purity is used as a raw material of single-crystal silicon for semiconductors, and as a raw material of silicon for solar cells. In addition to the increase in demand for polycrystalline silicon for highly integrated semiconductors used in electronic devices and information technology devices, demand for polycrystalline silicon as silicon for solar cells has rapidly been expanded recently, but at this time, the supply capacity of polycrystalline silicon is short and there is a situation that the marketing needs cannot be met. Polycrystalline silicon is supplied preferentially to semiconductor usage, and accordingly polycrystalline silicon used as a raw material for production of solar cells must be used residues in a crucible after pulling up a single-crystal silicon for semiconductors and scraps such as cutting waste of single-crystal silicon ingot, so that polycrystalline silicon for solar cells is in a situation depending on the movement of semiconductor industry in terms of both quality and quantity, and always in short. It has been strongly desired to develop a technique for producing polycrystalline silicon as a raw material of silicon for solar cells in a larger amount and at lower cost than the existing technique.

Nowadays, the production of polycrystalline silicon conducted commercially has been carried out by a Siemens process, but this process has a high electric power consumption rate of manufacturing consumption rates and the operation of production devices is a batch type, so its production efficiency is low. Therefore, it is unsuitable as a production method in a large amount and at low cost.

In contrast, regarding a method for producing polycrystalline silicon using a gas phase reduction of a silicon tetrachloride ($SiCl_4$) gas with a metal reducing agent such as a zinc gas, for example, silicon tetrachloride and zinc (Zn) gases are fed in a horizontal reactor made of quartz to grow polycrystalline silicon in the reactor. Therewith, zinc chloride ($ZnCl_2$) as a by-product is separated into zinc and chlorine by a method such as electrolysis, and the obtained zinc is reused as a reducing agent and the obtained chlorine is used for the synthesis of silicon tetrachloride, thereby enabling the production of polycrystalline silicon in a large amount and at low cost in a recycling process.

However, in this technique of producing a solid product using a reaction of gaseous raw materials, there are problems that the resulting solid product is easily contaminated due to materials of a reactor, and also due to a by-product gas generated by the reaction and unreacted gaseous raw materials.

Patent document 1: JP H4-365806 A (1992)
Patent document 2: JP H8-246001 (1996)
Patent document 3: JP 2000-345218 A
Patent document 4: JP H1-25922 A (1989)
Patent document 5: JP 2003-34519 A
Patent document 6: JP 2003-342016 A The present inventors have conducted many studies to solve pollution problems resulting from materials of a reactor in a method for producing polycrystalline silicon using a zinc gas as a reducing agent and a silicon tetrachloride gas as a raw material, and found that the problems are solved in such a way that a silicon chloride gas and a reducing agent gas are fed in a specific vertical reactor, polycrystalline silicon is generated at the tip of a silicon chloride gas feeding nozzle, and grown downward from the tip of the nozzle to prevent polycrystalline silicon from touching reactor walls. However, to further improve the quality, it is desired to establish a method for lowering an influence of a by-product gas generated by the reaction and unreacted gaseous raw materials as much as possible. Further, it is being desired to realize a method that allows polycrystalline silicon dropped in the lower part of a reactor to be continuously taken out of the reactor while maintaining the temperature of the reactor.

SUMMARY OF THE INVENTION

Problem to be Solved by the Invention

The present invention was accomplished in view of the above-described situations, and it aims to provide a production method and a production apparatus using a method for producing a solid product by a reaction of gaseous raw materials with a plurality of components, wherein the produced solid product is not contaminated by an exhaust gas containing a by-product gas generated by the reaction and unreacted gaseous raw materials, a higher purity can be achieved, and the produced solid product can be continuously taken out of the reactor.

Means to Solve the Problem

The present inventors continued to study keenly in order to solve the above-described problem. As a result, it has been found that the above-described problem can be solved by the following, and the present invention was accomplished on the basis of these findings: a method for producing a solid product using a reaction of gaseous raw materials with a plurality of components including a step of conducting the reaction using a reactor disposed substantially in a vertical direction (hereinafter referred to as a vertical reactor); a step of feeding the gaseous raw materials with a plurality of components from the upper part of the reactor; a step of, in the lower part of the reactor, forming a gas layer (hereinafter referred to as a seal gas layer) composed of a gas having a density equal to or more than the density of the gaseous raw materials or the following exhaust gas (hereinafter referred to as a seal gas) and fed continuously from the lower part of the reactor; a step of, along the uppermost surface of the formed seal gas layer, discharging an exhaust gas containing a by-product gas generated by the reaction and unreacted gaseous raw materials from the reactor; and a step of accommodating a solid product in the seal gas layer of the lower part.

The present invention is constituted as follows:

(1) A production method for producing a solid product using a reaction of gaseous raw materials with a plurality of components including a step of conducting the reaction using a vertical reactor; a step of feeding the gaseous raw materials with a plurality of components from the upper part of the reactor; a step of, in the lower part of the reactor, forming a seal gas layer composed of a seal gas fed continuously from the lower part of the reactor; a step of, along the uppermost surface of the formed seal gas layer, discharging an exhaust gas containing a by-product gas generated by the reaction and unreacted gaseous raw materials from the reactor; and a step of accommodating a solid product in the seal gas layer of the lower part.

(2) The production method for producing a solid product described in (1), wherein the seal gas layer has a linear velocity upward, and the linear velocity has a value equal to or more than the velocity that prevents the exhaust gas from diffusion into the seal gas layer.

(3) The production method for producing a solid product described in (1) or (2), wherein the seal gas layer has a temperature gradient that the temperature of the lower layer part is low and the temperature of the upper layer part is high.

(4) The production method for producing a solid product described in any one of (1) to (3), wherein the seal gas is a gas having a density equal to or more than the highest density of the raw material gases although being less than the density of a solid product produced by the reaction.

(5) The production method for producing a solid product described in any one of (1) to (4), wherein the gaseous raw materials with a plurality of components are a silicon chloride gas and a reducing agent gas, and the solid product is polycrystalline silicon.

(6) The production method for producing a solid product described in any one of (1) to (4), wherein the gas with a high density fed to the lower part of the reactor is a silicon chloride gas.

(7) The production method for producing a solid product described in (5) or (6), wherein the vertical reactor has a heating means on the outer periphery surface, has a silicon chloride gas feeding nozzle fitted into the inside of the reactor from the upper part of the reactor and a reducing agent gas feeding nozzle fitted into the inside of the reactor from the upper part of the reactor, and has a crystal-growth point of polycrystalline silicon at the tip of the silicon chloride gas feeding nozzle.

(8) The production method for producing a solid product described in (7), wherein the polycrystalline silicon is grown downward in the reactor.

(9) The production method for producing a solid product described in (8), wherein the polycrystalline silicon grown downward in the reactor is dropped and accommodated in the seal gas layer formed in the lower part by an increase in its own weight accompanied with its growth or by an external physical means.

(10) The production method for producing a solid product described in any one of (5) to (9), wherein, in the seal gas layer formed in the lower part of the reactor, a gas layer having a temperature gradient and a gas layer maintained at a substantially constant temperature touching the gas layer having a temperature gradient on the upper surface thereof are formed.

(11) The production method for producing a solid product described in any one of (5) to (10), wherein the polycrystalline silicon is accommodated in a gas layer maintained at a substantially constant temperature that is formed so as to touch a gas layer having a temperature gradient on the upper surface thereof.

(12) The production method for producing a solid product described in any one of (5) to (11), wherein the silicon chloride gas is a silicon tetrachloride gas and the reducing agent gas is gaseous zinc.

(13) The production method for producing a solid product described in (12), wherein a seal gas layer formed by the silicon tetrachloride gas fed to the lower part of the reactor has a linear velocity upward and the linear velocity is in the range of 4 to 100 mm/s.

(14) A production apparatus for producing a solid product using a reaction of gaseous raw materials with a plurality of components using a vertical reactor including a plurality of feed openings for gaseous raw materials on the upper part of the reactor; a gas-feed opening for continuously feeding a seal gas to form a seal gas layer by the gas provided in the lower part of the reactor; and an exhaust opening for discharging an exhaust gas containing a by-product gas generated by the reaction and unreacted gaseous raw materials at a position above the uppermost surface of the formed seal gas layer, wherein the seal gas layer is provided with a linear velocity upward, which is maintained at a high value equal to or more than the velocity that prevents the exhaust gas from diffusion into the seal gas layer, and provided with a temperature gradient that the temperature of the lower layer part is low and the temperature of the upper layer part is high, and a solid product is dropped and accommodated in the seal gas layer of the lower part.

(15) The production apparatus for producing a solid product described in (14), wherein the gaseous raw materials with a plurality of components are a silicon chloride gas and a reducing agent gas, and the solid product is polycrystalline silicon.

(16) The production apparatus for producing a solid product described in (15), wherein the reactor disposed vertically has a heating means on the outer periphery surface, and the plurality of feed openings for gaseous raw materials on the upper part of the reactor are a silicon chloride gas feeding nozzle and a reducing agent gas feeding nozzle being fitted into the inside of the reactor from the upper part of the reactor, and the reducing agent gas feeding nozzle is disposed so that the height of the opening thereof is higher than that of the silicon chloride gas feeding nozzle.

(17) The production apparatus for producing a solid product described in (15) or (16), wherein the production apparatus has a structure in which the seal gas layer formed in the lower part of a reactor is constituted of a gas layer having a temperature gradient and a gas layer maintained at a substantially constant temperature touching the gas layer having a temperature gradient on the upper surface thereof, and polycrystalline silicon is accommodated and stored in the gas layer maintained at a substantially constant temperature.

(18) The production apparatus for producing a solid product described in any one of (15) to (17), wherein the production apparatus has an device for heating and feeding a silicon tetrachloride gas as the silicon chloride gas, an device for feeding metal zinc in the form of gaseous zinc as a reducing agent gas, and an device for heating and feeding a silicon tetrachloride gas as the seal gas.

(19) The production apparatus for producing a solid product described in (17) or (18), wherein the temperature of the part for accommodating and storing polycrystalline silicon formed in the gas layer maintained at a substantially constant temperature that is in the seal gas layer formed in the lower part of the reactor is in the range of 100 to 300° C.

Effect of the Invention

By using the production method and the production apparatus of the present invention, a solid product produced is not contaminated by an exhaust gas containing a by-product gas generated by the reaction and unreacted gaseous raw materials, and thus it becomes possible to make the solid product with a high purity and to take out the solid product continuously from a reactor.

For example, in the case where such a solid product is polycrystalline silicon, it is generated right under a silicon chloride gas feeding nozzle equipped on the upper side of a reactor disposed in a vertical direction (hereinafter referred to as a vertical reactor), is grown continuously downward without touching reactor walls, and the polycrystalline silicon dropped from the nozzle by its own weight or by a physical means (for example, by applying an impact to the polycrystalline silicon produced downward from the silicon chloride gas feeding nozzle) is accommodated as a product without lowering in the quality.

In the production method of the present invention, an exhaust gas containing a by-product gas generated by the reaction of gaseous raw materials with a plurality of components (for example, a silicon chloride gas and a reducing agent gas) and unreacted gaseous raw materials is continuously discharged from the upper part of a seal gas layer (acting as a gas layer that prevents an exhaust gas from flowing into the lower layer part and further forming a storage environment for polycrystalline silicon) formed by a seal gas continuously fed from the lower part of the reactor. As a result, the seal gas layer does not undergo diffusion or inflow of an exhaust gas, and thus no condensation of the components of the exhaust gas occurs even if the temperature is lowered. Further, a solid product (for example, polycrystalline silicon) is rapidly accommodated in this seal gas layer, thereby preventing the lowering in the quality due to an exhaust gas to produce such a solid product (for example, polycrystalline silicon) with a high purity.

Further, the temperature of a reduction reaction of a silicon chloride gas and a reducing agent gas must be maintained preferably in the range of 800 to 1200° C., and more preferably 850 to 1050° C., but materials having durability under these temperature conditions are limited. However, in the present invention, by forming a seal gas layer having a temperature gradient, the temperature of the lower layer part of the seal gas layer can be lowered to a sufficiently lower temperature than the reduction reaction temperature although the temperature being equal to or higher than temperatures at which no condensation of components constituting the seal gas layer occurs, while the upper layer of the seal gas layer is maintained at a temperature most suitable as the reduction reaction temperature. Materials having durability at this temperature are easily available, and even a material that affects the quality when touching a solid product (for example, polycrystalline silicon) under high temperature conditions could be used without any influence on the quality once the temperature is lowered.

Further, with the use of the production method of the present invention, restrictions in device designing are reduced in such a manner that utilization of a device using a material which has hardly been used at high temperatures becomes possible and a lot of techniques that can used in combination with such a production method can easily be utilized, and so on.

The production method of the present invention enables realizing contradictory two necessary conditions, i.e., a high temperature condition necessary for production of a solid product and a low temperature condition to the utmost extent for quality maintenance of a solid product, handling of products and materials of devices, without contradiction.

As described above, the production method of the present invention, by which quality loss due to contamination of a solid product is prevented, the restrictions in usable materials are reduced and the freedom in device designing is expanded, enables producing a solid product with a high purity continually and liberally at relatively low cost as well.

Further, for the above reasons, a solid product obtained is high in purity, and obtained polycrystalline silicon can be used not only as a raw material of silicon for solar cells but also as a raw material of silicon for semiconductors (having a purity of 99.99 wt % or more, and preferably 99.999 wt % or more).

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
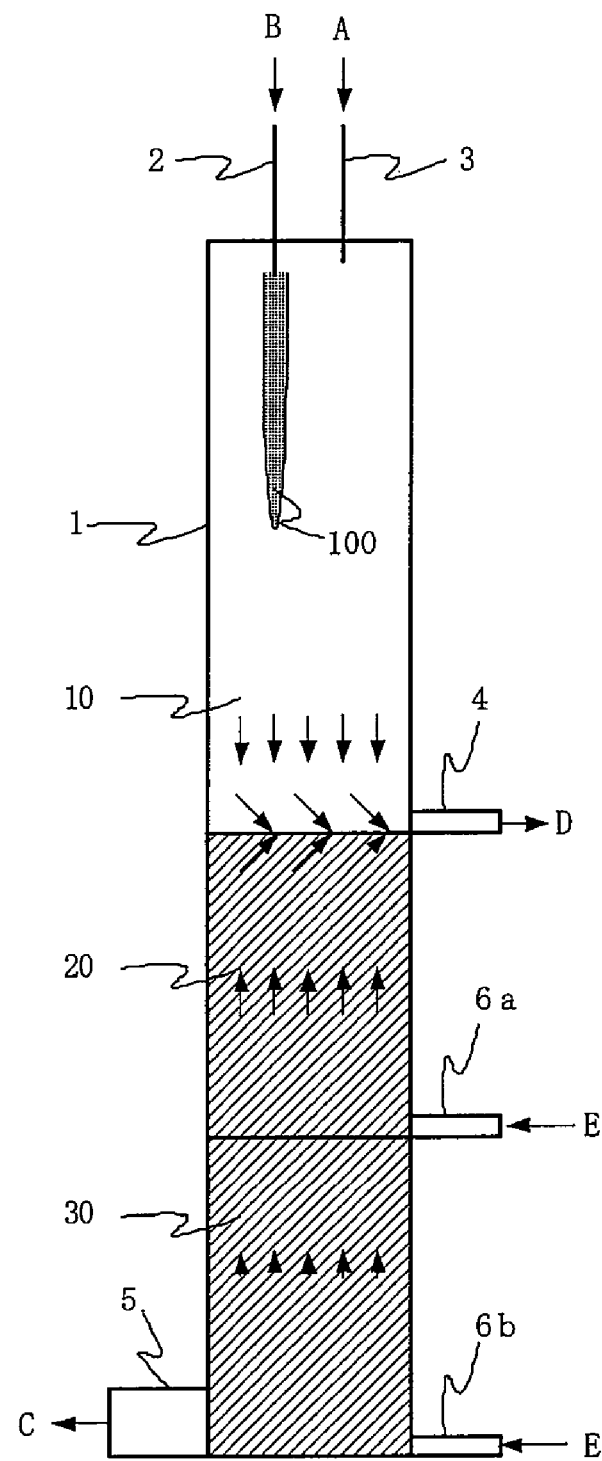
FIG. 1 is a schematic diagram showing the basic constitution of the method for producing polycrystalline silicon with a high purity according to the present invention, and the arrows schematically represent gas flow in each layer. It is a schematic diagram to schematically show a method in which a velocity (force) of a by-product gas flowing downward from the reduction reaction layer 10 and a velocity (force) that the seal gas layer formed in the lower side has upward and protects against it are balanced at an exhaust gas extracting position and discharged from the system at this position while suppressing the invasion of the by-product gas.

Reference will now be made in detail to the present preferred embodiments of the invention, examples of which are illustrated in the accompanying drawings. Wherever possible, the same reference numbers are used in the drawings and the description to refer to the same or like parts.

Regarding the best mode for carrying out the invention, production of polycrystalline silicon using a gas phase reaction of a silicon chloride gas and a reducing agent gas will be explained as an example.

In this reaction, a vertical reactor is used, and a silicon chloride gas and a reducing agent gas are respectively fed from a silicon chloride gas feeding nozzle and a reducing agent gas feeding nozzle inserted downward from the upper part of the reactor. By the reaction of both gases, polycrystalline silicon is generated at the tip of the silicon chloride gas feeding nozzle, which is grown downward from the tip of the nozzle. In the lower part of the vertical reactor, a seal gas layer is formed using a gas having a density equal to or more than the highest density of the silicon chloride gas, reducing agent gas and a by-product gas generated by the reaction as a seal gas, the produced polycrystalline silicon is continuously or intermittently accommodated in the seal gas layer, and an exhaust gas generated by the reaction (a gas containing a by-product gas generated by the reaction and unreacted gaseous raw materials) is continuously discharged from a position above the seal gas layer.

Preferably, the seal gas layer is formed by continuously feeding a seal gas (preferably a silicon chloride gas) from the lower part of the reactor, rises at a linear velocity more than the velocity necessary for preventing an exhaust gas from diffusion into the seal gas layer, an exhaust gas is continuously discharged from the reactor, and the uppermost layer of the seal gas layer is discharged slowly together with the exhaust gas. The discharged seal gas is isolated to be used in the reaction cycles.

Preferably, the seal gas layer has a temperature gradient between the upper part and the lower part, and the lower layer part of the seal gas layer is at a sufficiently lower temperature than the reduction reaction temperature although being equal to or higher than temperatures at which no condensation of the seal gas (for example, a silicon chloride gas) occurs, whereas the upper layer part of the seal gas layer is maintained at a temperature most suitable as the reduction reaction temperature.

After the polycrystalline silicon generated and grown downward from the tip of the silicon chloride gas feeding nozzle is dropped continuously or intermittently by its own weight or by a physical means, it is rapidly accommodated and stored in the seal gas layer, which eliminates contacts between the polycrystalline silicon and the exhaust gas and can prevent contamination due to the exhaust gas.

The production method and the production apparatus for producing a solid product according to the present invention will be described in detail below with reference to drawings, taking a production method and a production apparatus for producing polycrystalline silicon with a high purity as an example.

The production apparatus for producing a polycrystalline silicon with a high purity that exemplifies the present invention uses an about cylindrical reactor 1 with a constitution shown in FIG. 1. The reactor 1 disposed vertically is constituted of three layers and has a structure possessing a reduction reaction layer 10 in the uppermost part, a seal gas heating layer 20 having a temperature gradient in the lower part, and a storage part 30 in the further lower part; and a silicon chloride gas feeding nozzle 2 and a reducing agent gas feeding nozzle 3 are each inserted downward from the upper part of the reactor 1. To explain the invention comprehensibly, the seal gas layer in the present exemplification is shown as a seal gas layer constituted of two layers, i.e., a seal gas heating layer 20 and a storage layer 30, but many further layers separated by their function may be provided, and these layers may also be integrated in layers with combined functions. An exhaust gas extracting pipe 4 is disposed somewhere in the upper part of the seal gas heating layer 20. A seal gas introducing pipe 6a is disposed somewhere in the lower part of the seal gas heating layer 20. Further, a product accommodation device 5 can be attached to the storage part 30 to take out a product, and furthermore, a seal gas introducing pipe 6b can be attached thereto according to need. In the case where the seal gas layer has a structure possessing many further layers, a lot of seal gas introducing pipes can be provided as needed to introduce a seal gas separately in multistage.

Regarding the internal temperature of this reactor 1, the reduction reaction layer 10 is set to a temperature most suitable for a reduction reaction, the storage part 30 is set to a temperature higher than temperatures at which the seal gas is condensed although being sufficiently lower than the reduction reaction temperature, and the seal gas heating layer 20 is provided with a temperature gradient so that the upper part is at the reduction reaction temperature and the lower part is at the storage part temperature. In a state where each layer is maintained at a predetermined temperature, a seal gas is introduced to the reactor 1 from the seal gas introducing pipe 6a, and if necessary, also from the seal gas introducing pipe 6b to fill the insides of the seal gas heating layer 20 and the storage part 30 with the seal gas, and then a silicon chloride gas and a reducing agent gas are fed to the reactor 1 through the respective nozzles. A gas phase reaction is conducted in a reactor having such constitutions, and polycrystalline silicon 100 aggregated in a tubular shape is grown downward at the opening end of the silicon chloride gas feeding nozzle 2. The reducing agent gas fed to the reactor 1 from the reducing agent gas feeding nozzle 3 has a low density, and thus it fills the reactor 1 by diffusing from the upper part thereof On the other hand, the silicon chloride gas with a high density fed from the silicon chloride gas feeding nozzle 2 diffuses while descending directly downward, and is reduced by the reducing agent gas to produce polycrystalline silicon (hereinafter called tubular aggregation polycrystalline silicon). An exhaust gas containing a by-product gas generated by the reaction and unreacted gaseous raw materials has a lower density than the seal gas, and thus it is rapidly discharged from the exhaust extracting pipe 4 disposed in the upper part of the seal gas heating layer 20.

After tubular aggregation polycrystalline silicon is grown to some extent in length by continuing the reaction, it is dropped from the nozzle by its own weight or by mechanical shock to fall down in the lower part of the reactor. Thereafter, if a raw material is further fed continuously, a new piece of tubular aggregation polycrystalline silicon is grown at the silicon chloride feeding nozzle 2. The tubular aggregation polycrystalline silicon dropped leaves the reduction reaction layer 10, passes through the sealing gas heating layer 20, and then reaches the storage layer 30. The inside of the storage layer 30 is filled with the seal gas whose temperature is maintained at a sufficiently low temperature compared with the temperature of the reaction layer, and diffusion of the exhaust gas containing a by-product gas generated by the reaction and unreacted gaseous raw materials into the seal gas is prevented by the continuous introduction of the seal gas, and thus the influence on the quality of the dropped tubular aggregation polycrystalline silicon due to the exhaust gas components can be prevented. Further, the temperature of the storage part can be set to a sufficiently low temperature compared with the temperature of the reaction layer, so that the influence on the quality due to contacts between device materials constituting the storage part and the tubular aggregation polycrystalline silicon can be prevented.

Such a seal gas is required not to influence a reduction reaction and the quality of the produced tubular aggregation polycrystalline silicon. It is required also to have a gas density that is equal to or more than those of raw materials used and a by-product gas generated and is lower than that of a solid product to be obtained at the reduction reaction temperature. When using zinc as a reducing agent, silicon chloride is used as a preferable seal gas because it has a higher density than a zinc gas or a zinc chloride gas at the reaction temperature. Further, it is the same kind of material as the raw material, so it is more preferable because it shares the same silicon chloride storage facility for easy accommodation and it is reusable. The use of silicon tetrachloride as a silicon chloride is the most preferable because its gas density is high compared with a zinc gas and a zinc chloride gas as a major component in the exhaust gas, and further it is an easily available material.

The introduction velocity of a seal gas needs to be set to a larger velocity than a linear velocity necessary for preventing exhaust gas components from diffusion and inflow into the seal gas. In introducing the seal gas at a suitable velocity, by a linear velocity that the seal gas has upward from the lower side relative to the velocity of diffusing and flowing into the seal gas layer 20 from the reduction reaction layer 10 shown as arrows in FIG. 1, and by a difference between its density and that of the exhaust gas, the exhaust gas is guided toward the exhaust gas extracting pipe 4. Introduction of the seal gas and continuous extraction of the exhaust gas enables preventing the exhaust gas from diffusion into the seal gas. The seal gas is preferably pre-heated outside the reactor and then introduced. Further, if necessary, it can also be introduced after being cooled or in a liquid form to control the temperature utilizing latent heat of vaporization. The layer-height of the seal gas heating layer 20 is calculated from reaction layer and storage layer temperatures, flow rate and heat balance of the seal gas, and further, the necessary height can be ensured from experiments.

The storage layer 30 is controlled in the necessary temperature range, and the amount and the size in unit time of tubular aggregation polycrystalline silicon that is grown by the reaction and then dropped, the take-out amount in unit time thereof using a take-out device, and the necessary height and volume are ensured. More preferably, structural materials having strength enough to withstand damage due to dropping tubular aggregation polycrystalline silicon and giving no influence on the quality even when touching tubular aggregation polycrystalline silicon are selected and used. By using the production method of the present invention, the temperature of the storage layer 30 can be markedly lowered compared with the temperature of the reduction reaction layer 10, so that the quality of obtained polycrystalline silicon meets the standards thereof even if easily available materials (for example, an acid-resistance enhanced stainless material) are used.

The exhaust gas extracting pipe 4 is not particularly limited as long as its structure can smoothly discharge an exhaust gas containing a by-product gas generated by the reaction and unreacted gaseous raw materials and a seal gas continuously fed from the lower part of the reactor.

The height of the reduction reaction layer 10 is not largely affected even in the case of the production method incorporating the present invention. The boundary part between the reduction reaction layer 10 and the seal gas heating layer 20 gives a lateral linear velocity toward the exhaust gas extracting pipe, so the reduction reaction layer 10 may be designed based on the same concept as the production method not incorporating the present invention.

In regard to a method of reduction reaction of silicon chloride using a reducing agent, the key points will be described below.

Preferably, the silicon chloride gas feeding nozzle 2 is disposed at a predetermined position apart from the wall of the reactor 1, and as for the reducing agent gas feeding nozzle 3, its nozzle opening is disposed at a height higher than that of the silicon chloride gas feeding nozzle 2. The tip of the silicon chloride feeding nozzle 2 is preferably processed to have a gas-guide means leading a gas flow downward. In the case where a plurality of silicon chloride gas feeding nozzles and a plurality of reducing agent gas feeding nozzles are provided, it is preferable to provide them in such a manner that the distance between the respective nozzles is considered not to disturb the reaction one another and the diameter of the reactor is also considered. The feed velocity of the reducing agent gas is not particularly limited as long as it is a velocity not disturbing the flow of the silicon chloride gas in the reactor, but the feed velocity of the silicon chloride gas must be a velocity not causing turbulent flow. The installation location and the number of reducing agent gas feeding nozzles 3 are not particularly limited as long as they satisfy a sufficient diffusion of a reducing agent gas in a container.

The feature of the production method of the present invention is that an exhaust gas containing a by-product gas generated by the reaction of a silicon chloride gas and a reducing agent gas and unreacted gaseous raw materials is discharged from the upper part of a seal gas layer formed in the lower part of the inside of a vertical reactor by a silicon chloride gas fed continuously from the lower part of the reactor, which prevents the exhaust gas from diffusion or inflow into the seal gas layer. From the test results shown in FIG. 3 using a zinc chloride gas and a silicon tetrachloride gas, it is obvious that the zinc chloride gas is discharged from the upper part of the seal gas layer formed by the silicon tetrachloride gas and thereby condensation due to diffusion or inflow of the zinc chloride gas into the seal gas layer can be sufficiently reduced. Further, this effect becomes large in proportion to an increase in a linear velocity toward the upper side of the seal gas layer. Specifically, if the linear velocity toward the upper side is in the range of 4 to 100 mm/s, the diffusion or inflow can be prevented almost perfectly.

Figure 4:
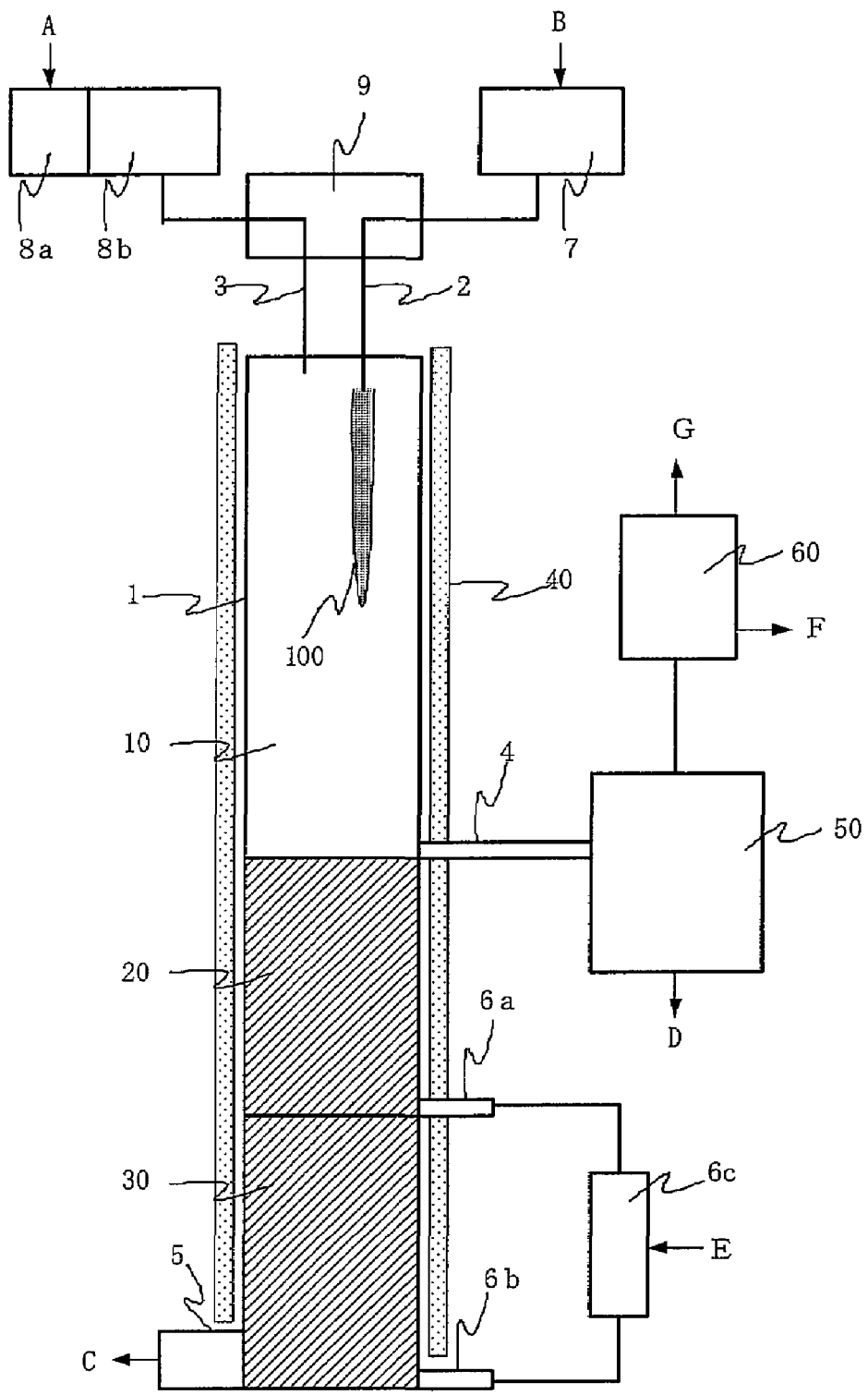
FIG. 4 is a rough block diagram of the test apparatus used in Example 2, which has the basic constitution of the present invention shown in FIG. 1.

Basic methods and constitutions necessary for a method for producing polycrystalline silicon with a high purity using a vertical reactor to which the production method according to the present invention is applied have been described above; hereinafter, the present method incorporated in a practical production line will be explained. FIG. 4 is a schematic diagram showing an example of production facilities for producing polycrystalline silicon where the method for producing polycrystalline silicon with a high purity according to the present invention is incorporated. However, the present invention is not limited to these descriptions, but includes the scope that so-called those in the art can suitably add modifications on the basis of the entire descriptions in the present specification.

The reactor 1 is heated by the reactor heating furnace 40, and the reduction reaction layer 10, the seal gas heating layer 20 and the storage layer 30 are respectively maintained at a suitable temperature. The reducing agent A is gasified by the fusion furnace 8a, the evaporation furnace 8b or the like, and the silicon chloride B is gasified by the vaporization device 7 or the like. The gasified reducing agent A and gasified silicon chloride B are heated by the heating oven 9 provided before the reactor 1 to a temperature in the range of 800 to 1200° C., which is suitable for a reduction reaction, and fed to the reactor 1. The temperature of the reduction reaction layer 10 is maintained in the range of 800 to 1200° C. The temperature of the storage layer 30 is maintained in the range of the condensation temperature of the seal gas to about 300° C. The seal gas E is fed from the device for heating and feeding a seal gas 6c through the seal gas feeding pipes 6a and 6b. The seal gas heating layer 20 is controlled so that the upper part thereof is at the temperature of the reduction reaction layer 10 and the lower part thereof is at the temperature of the storage layer 30 by external heat and, if necessary, by changing the introduction temperature of the seal gas.

The silicon chloride gas fed into the reactor 1 from the silicon chloride gas feeding nozzle 2 is reduced rapidly by a reducing agent gas fed from the reducing agent gas feeding nozzle 3 to provide silicon. The generated silicon is grown toward the lower part of the silicon chloride gas feeding nozzle 2 while aggregating in a tubular shape as polycrystalline silicon starting from the tip of the nozzle. When this tubular aggregation polycrystalline silicon 100 is grown to some extent in length, it is dropped from the nozzle by its own weight or by a physical or mechanical means to fall down in the lower part of the reactor. Thereafter, when the raw material is further fed continuously, a new piece of tubular aggregation polycrystalline silicon 100 is grown from the tip of the silicon chloride gas feeding nozzle 2.

The tubular aggregation polycrystalline silicon 100 grown inside the reactor 1 drops in the storage layer 30 passing through the seal gas heating layer 20. Disturbance in the seal gas layer due to this drop and disturbance of airflow in the reduction reaction layer are temporary, and thus have no effect on the reaction and crystal growth if the height of the seal gas layer is sufficient. It is possible to take out the polycrystalline silicon C from the storage layer 30 to the product accommodation device 5 via a shutter type valve, etc.

In the exhaust gas extracted from the exhaust gas extracting pipe 4, there are included reducing agent chloride (for example, zinc chloride), unreacted silicon chloride, an unreacted reducing agent and polycrystalline silicon particles of tubular aggregation polycrystalline silicon 100 inside the reactor 1. Using a tank for recovering reducing agent chloride 50, a condenser of silicon chloride 60 or other means, individually separated and recovered as the solid content D of the reducing agent chloride, an unreacted reducing agent and others, and the gas component F such as unreacted silicon chloride and the seal gas, which are reused. Exhaust gases or the like being not reusable are suitably treated by the exhaust gas treatment device G.

In the reduction reaction layer 10, silicon crystals of the polycrystalline silicon 100, aggregate in a tubular shape and grow so as to hang from the tip of the silicon chloride gas feeding nozzle 2, so they do not touch the inner wall surface of a reactor, and is not contaminated by reactor materials. For the reason described above, there is a merit that materials constituting a reactor are not greatly restricted, and as the material for a reactor, a material that withstands temperatures in the use temperature range, such as quartz and silicon carbide, can be used.

The storage layer 30 directly receives the polycrystalline silicon grown and dropped, and directly touches the polycrystalline silicon. However, in the present invention, the temperature inside the storage layer 30 is markedly low compared with the reaction temperature, and is maintained at a temperature being equal to or higher than the condensation temperature of the seal gas and preferably maintained at a temperature being 300° C. or less, so that contamination by the materials thereof is markedly suppressed compared with that occurs in high temperature environment. There can be used a material having resistance to a seal gas, strength enough to withstand damage by dropping pieces of polycrystalline silicon 100, such as a stainless material having acid resistance.

In the seal gas heating layer 20, the upper part thereof is at the reduction reaction temperature, and the lower part thereof is at the storage layer temperature. Therefore, this member always contains heat stress due to a temperature gradient, so the selection of materials must be made considering resistance to this heat stress as well. A material that withstands temperatures in the use temperature range, such as quartz and silicon carbide, can be used, and also stainless steel or the like can be used near the storage layer having a lower temperature.

It is further favorable that the temperature of the storage layer 30 is preferably as low as 300° C. or less, thereby enabling the use of various kinds of materials. In the storage layer 30, a product accommodation device having a gas substitution function and a product take-out function is easily installed via a shutter type valve. By using this product accommodation device, the polycrystalline silicon C can be easily taken out of the storage layer 30 while keeping a reduction reaction proceeding in the upper part of the reduction reaction layer 10 in the reactor 1. For the reason described above, the production method of the present invention enables establishing a process for obtaining polycrystalline silicon with a high purity continuously without stopping operation and producing inexpensive polycrystalline silicon with a high purity stably in a large amount.

The silicon chloride used in the present invention is selected from silicon chlorides expressed by $Si_mH_nCl_{2m+2-n}$ (m is an integer of 1 to 3, n is an integer being 0 or more although not exceeding 2m+2). Further, different silicon chlorides can also be used after the selection based on the aim of use, such as for a raw material or for a seal gas. However, using silicon tetrachloride for both silicon chloride B, a raw material, and seal gas E is preferable because it is easily available and is readily recovered and purified without generating a complicate by-product. Further, as the reducing agent, there can be used a reducing agent based on metal, such as sodium (Na), potassium (K), magnesium (Mg) and zinc (Zn), as well as hydrogen gas ($H_2$), and among these, zinc is preferable because it has a relatively low affinity to oxygen and can be handled safely.

The feed amounts of the silicon chloride gas and the reducing agent gas used in the production method of the present invention are not particularly limited as long as they allow the reduction reaction to proceed sufficiently; however, for example, the mole ratio of these gases in the range of 1:10 to 10:1 (silicon chloride gas : reducing agent gas), and preferably in the range of 1:4 to 4:1. By supplying the silicon chloride gas and the reducing agent gas at a mole ratio in the above-described range, polycrystalline silicon can be stably generated and grown.

The reaction between the silicon chloride gas and the reducing agent gas is performed at a temperature preferably in the range of 800 to 1200° C., and more preferably in the range of 850 to 1050° C. Therefore, it is preferable that a silicon chloride gas and a reducing agent gas heated to a temperature in the above-described temperature range are fed into the reduction reaction layer 10 heated and controlled to a temperature in the above-described temperature range.

Regarding the introduction velocity of the seal gas, the linear velocity on the upper surface of the seal gas heating layer 20 has to be equal to or more than the diffusion velocity of an exhaust gas diffusing and flowing toward the seal gas heating layer 20 from the reduction reaction layer 10. Preferably, the radius of a reactor and temperature change are considered and introduced so that the seal gas has a liner velocity preferably in the range of 4 to 100 mm/s. When the linear velocity is in the above-described range, diffusion and inflow of an exhaust gas into the seal gas layer can be prevented and the loss of the seal gas in an exhaust gas and the loss of heat for seal gas heating are reduced.

The temperature of the exhaust gas extracting pipe is equal to the reactor temperature to prevent clogging due to condensation of by-product and unreacted gases, and preferably maintained at a temperature higher than the reaction temperature.

EXAMPLES

Hereinafter, the present invention is explained in more detail on the basis of Examples, but the present invention is not limited to these Examples.

Example 1

Figure 2:
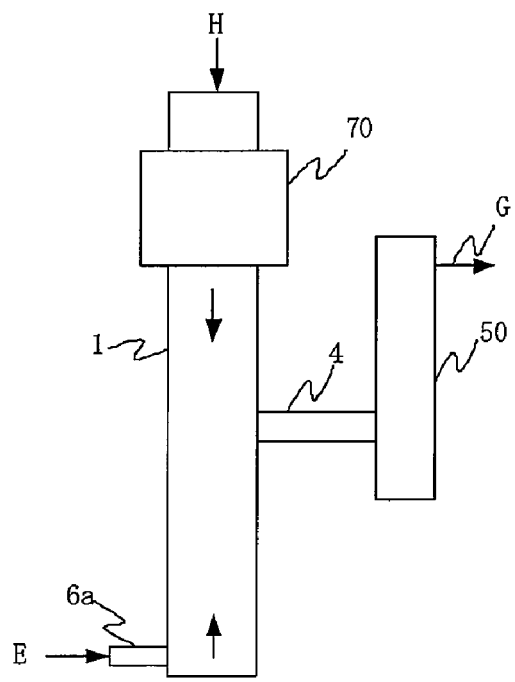
FIG. 2 is a block diagram of the test apparatus used for seeking a method for preventing an exhaust gas from diffusion or inflow into a seal gas layer and also for obtaining the optimum conditions.

A test of the method for preventing a by-product gas from diffusion or inflow into a seal gas layer was conducted using an apparatus shown in FIG. 2. The reactor 1 was made of quartz and had a size of about 1000 mm in height and 50 mm in diameter. In the upper part of the reactor 1, a device for heating and generating a zinc chloride gas 70 by which gasified zinc chloride is generated by external heat was incorporated. In the middle part, there was provided an exhaust gas extracting pipe 4 with about 30 mm diameter, and a tank for recovering reducing agent chloride 50 made of glass and having a size of about 600 mm in height and 50 mm in diameter was connected to the tip of the exhaust gas extracting pipe. In the lower part, there was provided a seal gas introducing pipe 6a, and a seal gas was fed from a device for heating and feeding a seal gas. In this test, silicon tetrachloride was used as the seal gas. In the upper part, there was provided a pipe for introducing the balance gas H, thereby changing the linear velocity and the composition of the generated zinc chloride gas. The reactor 1 was separated into three parts, i.e., the part of the device for heating and generating a zinc chloride gas 70, the connection part of the exhaust gas extracting pipe 4 and the lower part of the reactor 1, and was kept at a predetermined temperature as a whole by a heating device.

Further, the exhaust gas extracting pipe 4 and the tank for recovering reducing agent chloride 50 were each kept at a predetermined temperature by a heating device. An exhaust gas from the tank for recovering reducing agent chloride 50 was connected to the gas treatment device G. The test apparatus was sealed with nitrogen, and while allowing it to flow at a predetermined flow rate, the whole apparatus excluding the device for heating and generating a zinc chloride gas 70 was heated to a predetermined temperature, and then the seal gas E heated to a predetermined temperature was introduced thereinto from the seal gas introducing pipe 6a. In this state, the device for heating and generating a zinc chloride gas 70 was heated to a predetermined temperature to generate a zinc chloride gas. The zinc chloride gas generated from the upper part was allowed to flow downward, whereas the seal gas from the lower part was allowed to flow upward, and both were discharged from the exhaust gas extracting pipe. For the zinc chloride gas and seal gas discharged, zinc chloride was condensed in the tank for recovering reducing agent chloride 50, separated from the seal gas, and recovered. The state of diffusion of zinc chloride into a seal gas layer was evaluated as follows; after cooling the whole test apparatus, the weights of zinc chloride aggregated and recovered inside the reactor 1 and the tank for recovering reducing agent chloride 50 were each measured to obtain the ratio of weight condensed inside the reactor 1, which was defined as the diffusion condensation rate, and evaluation was made based on this value.

Figure 3:
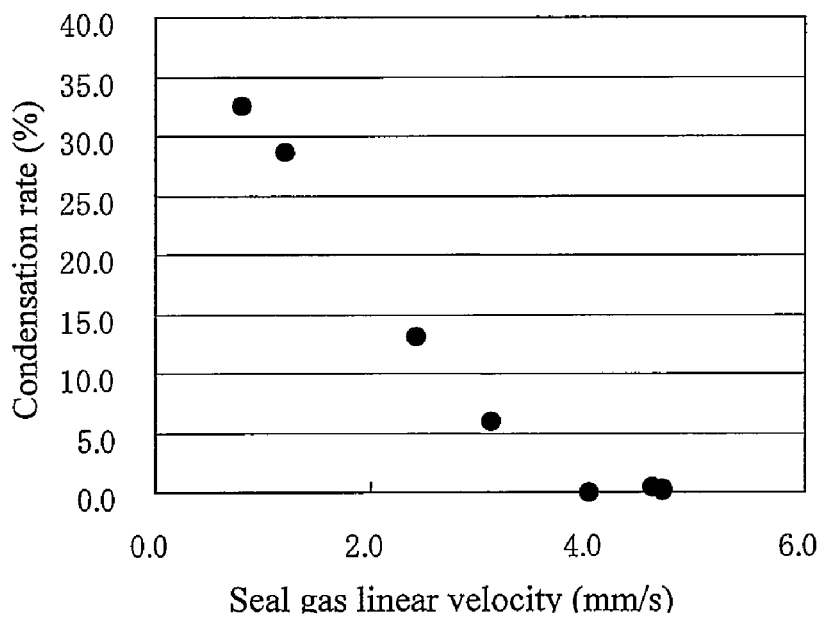
FIG. 3 is a graph showing the relationship between the linear velocity of a seal gas layer and the diffusion condensation amount of zinc chloride into the seal gas layer. It indicates that inflow and condensation of zinc chloride are suppressed by an increase in the linear velocity of the seal gas layer, and they can be suppressed almost completely at a certain linear velocity or higher. Additionally, "%" means wt %.

Tests were carried out under the conditions shown in Table 1 and the test results shown in Table 2 were obtained. The linear velocity of each component was calculated from the feed amount per unit time in conversion of temperature. The relationship between the linear velocity and the diffusion aggregation amount is shown in FIG. 3. From FIG. 3, it is obvious that diffusion condensation of a zinc chloride gas is more suppressed with an increase in the linear velocity of a seal gas. Further, it is clear that, in the case where a seal gas has a linear velocity of 4 mm/s or more upward, regardless of the linear velocity of a zinc chloride gas, diffusion condensation of a zinc chloride gas is suppressed by 99.5 wt % or more. The temperature of the connection part of the exhaust gas extracting pipe greatly affects the diffusion aggregation rate. The boiling point of zinc chloride is 732° C., so when the temperature of this part is set to be lower than this temperature, the diffusion aggregation rate inside the reactor 1 is increased. This suggests that the temperature should preferably be maintained at a temperature equal to or higher than the boiling point of zinc chloride. In Test-9, the temperature of the connection part of the exhaust gas extracting pipe was set to be 700° C., and thus the zinc chloride gas was not sufficiently discharged from the system of the reactor 1, so that the condensation of zinc chloride began. Components constituting a gas also affect diffusion aggregation. Test-10, in which a large amount of a gas having the same components as the seal gas was fed from the upper part, suggested that diffusion aggregation becomes more significant under conditions where a density difference between a seal gas and a by-product gas is small. This demonstrates that, when such an apparatus is operated under such conditions, the linear velocity of a seal gas to be fed must be adjusted to be higher.

TABLE 1

|  | Internal temperature | | | | Feed amount | | Balance gas | |
| --- | --- | --- | --- | --- | --- | --- | --- | --- |
|  | TEMP-1 ° C. | TEMP-2 ° C. | TEMP-3 ° C. | TEMP-4 ° C. | Zinc chloride g/h | Seal gas g/h | Feed amount l/h | Component Nitrogen |
| Test-1 | 700 | 745 | 525 | 100 | 20 | 49 | 6.5 | Nitrogen |
| Test-2 | 750 | 890 | 520 | 100 | 567 | 50 | 0.4 | Nitrogen |
| Test-3 | 750 | 850 | 500 | 100 | 467 | 51 | 0.4 | Nitrogen |
| Test-4 | 750 | 790 | 525 | 100 | 512 | 55 | 0.4 | Nitrogen |
| Test-5 | 735 | 795 | 295 | 100 | 35 | 9 | 0.4 | Nitrogen |
| Test-6 | 735 | 785 | 95 | 100 | 272 | 14 | 0.4 | Nitrogen |
| Test-7 | 790 | 795 | 290 | 100 | 138 | 27 | 0.7 | Nitrogen |

TABLE 1-continued

|  | Internal temperature | | | | Feed amount | | Balance gas | |
|---|---|---|---|---|---|---|---|---|
|  | | | | | Zinc | Seal | Feed | |
|  | TEMP-1 °C. | TEMP-2 °C. | TEMP-3 °C. | TEMP-4 °C. | chloride g/h | gas g/h | amount l/h | Component Nitrogen |
| Test-8 | 745 | 805 | 300 | 100 | 166 | 36 | 0.4 | Nitrogen |
| Test-9 | 745 | 700 | 310 | 100 | 268 | 63 | 0.4 | Nitrogen |
| Test-10 | 735 | 800 | 295 | 100 | 62 | 45 | (27 g/h) | SiCl$_4$ |

TEMP-1: Temperature of the device for heating and generating a zinc chloride gas
TEMP-2: Temperature of the connection part of the exhaust gas extracting pipe and the exhaust gas pipe
TEMP-3: Temperature of the lower part of the reactor 1
TEMP-4: Temperature of the seal gas fed

TABLE 2

| | Linear velocity | | |
|---|---|---|---|
| Test number | Zinc chloride mm/s | Seal gas mm/s | Diffusion condensation rate % |
| Test-1 | 2.0 | 4.0 | 0.0 |
| Test-2 | 66.4 | 4.7 | 0.2 |
| Test-3 | 52.9 | 4.6 | 0.5 |
| Test-4 | 54.9 | 4.7 | 0.3 |
| Test-5 | 3.7 | 0.8 | 32.5 |
| Test-6 | 29.0 | 1.2 | 28.6 |
| Test-7 | 15.0 | 2.4 | 13.2 |
| Test-8 | 17.9 | 3.1 | 5.9 |
| Test-9 | 23.9 | 5.0 | 63.4 |
| Test-10 | 6.7 | 3.9 | 6.8 |

Remark:
"%" in Table 2 means wt %.

Example 2

A production test of polycrystalline silicon was conducted using the test production apparatus constituted as shown in the schematic diagram exemplified in FIG. 4 and the quality was checked. The reactor was made of quartz and had a structure combining a quartz cylinder of 200 mm in inner diameter and 3350 mm in length as the upper member and a stainless steel cylinder of 200 mm in inner diameter and 1300 mm in length as the lower member. At a height 2000 mm apart from the upper part of the test apparatus, an exhaust gas extracting pipe of 40 mm in inner diameter and 700 mm in length was attached, and there was provided a seal gas introducing opening at a height of 3500 mm. In the central part of the ceiling of the reactor, one silicon chloride feeding pipe made of quartz and having an inner diameter of 20 mm, of which the tip had been processed to be thin-walled was inserted. Further, at a position 60 mm apart from the center toward the circumference, reducing agent gas feeding pipes made of quartz and having an inner diameter of 20 mm were inserted in such a manner that the silicon chloride feeding pipe was sandwiched from both sides thereof. The opening position of the silicon chloride feeding pipe was set to be 250 mm apart from the ceiling part, and the opening positions of the reducing agent gas feeding pipes were each set to be 215 mm apart from the ceiling part. Under the above-described constitution, the height of the reduction reaction layer 10 was 2000 mm, the height of the seal gas heating layer 20 was 1500 mm and the height of the storage layer was 1150 mm.

The test was conducted as follows. First, the inside was replaced with high-purity nitrogen, and thereafter the temperature of the surrounding reactor heating furnace was raised so that the temperatures of the reduction reaction layer, the upper layer of the seal gas heating layer, the lower layer of the seal gas heating layer and the storage layer was respectively increased to and maintained at 950° C., 950° C., 100° C. and 100° C. In this state, from the seal gas introducing opening, silicon tetrachloride as a seal gas heated to 110° C. was introduced at a velocity of 1.5 kg/h (8 mm/s, 950° C.), which filled the inside and also gave a linear velocity upward to the seal layer in the lower part of the reaction layer. Further, from the upper part, silicon tetrachloride heated to 950° C. through the silicon chloride feeding nozzle and a zinc gas heated to 950° C. through the reducing agent gas feeding nozzle were introduced so that the mole ratio of silicon tetrachloride to zinc was 0.6 to 1. Under the conditions, the reaction was allowed to proceed for 30 hours. The velocity of silicon tetrachloride at the nozzle exit was in the range of 1000 to 1500 mm/s, and the velocity of zinc at the nozzle tip was in the range of 900 to 1300 mm/s.

After completion of the reaction, the feed of the zinc gas and silicon tetrachloride and the introduction of seal gas were stopped, the inside of the reactor was substituted with high-purity nitrogen and cooled, and then the storage layer was opened and three pieces of tubular aggregation polycrystalline silicon fell therein were observed. Further, growing polycrystalline silicon was observed at the tip of the silicon chloride feeding nozzle. The weight of polycrystalline silicon dropped and accommodated was 8.5 kg, and the purity was 99.999 wt % or more. The temperature of the storage layer was maintained at a predetermined temperature during the reaction and no extreme increase in temperature was observed.

Additionally, as for purity analysis of silicon, metal elements contained in a solution after silicon contained therein was decomposed by HF/HNO$_3$ and removed; 17 elements (Zn, Al, Ca, Cd, Cr, Cu, Co, Fe, Mn, Mo, Na, Ni, Pb, Sn, Ti, P and B) were quantitatively determined by high-frequency inductively-coupled plasma atomic emission spectrometry (ICP-AES; using IRIS-AP from Nippon Jarrell-Ash) and the silicon purity was obtained by subtracting the total quantitative values of the 17 elements from 100 wt %.

Comparative Example 1

An example without using the method according to the present invention is described. Using the apparatus shown in FIG. 4, a test was conducted with the same procedures and conditions as those in Example 2. However, the test was conducted without introduction of a seal gas. A rise in the temperature of the storage layer and significant precipitation of colored substances were observed as time elapsed. Under the conditions without seal gas introduction, it was impossible to continue the reaction while maintaining the temperature of the storage layer part at a low temperature. The operation was stopped after the reaction had proceeded for 20 hours, the inside of the reactor was substituted with high-quality nitrogen and cooled, and then the storage part was opened to check the product. A large amount of light brown powder was found inside the storage part, and a light brown substance adhered on the wall surface of the storage part was also observed. Although it was confirmed that two pieces of tubular aggregation polycrystalline silicon fell down therein, they were present in a state of being covered with the light brown powder. In the reduction reaction layer, tubular aggregation polycrystalline silicon growing from the tip of the silicon chloride feeding nozzle was also observed. The weight of polycrystalline silicon dropped and accommodated was 5.5 kg. The light brown powder and the substance adhered on the wall surface were sampled and analyzed, and the analysis found them to be a mixture of zinc chloride, zinc metal and silicon particles. In the polycrystalline silicon dropped and accommodated, Zn of 0.8 wt % together with Fe, Cr, Ni and Al was detected as an impurity, and the purity was 99.2 wt %. The purity of the tubular aggregation polycrystalline silicon growing from the tip of the silicon chloride feeding nozzle was 99.999 wt %.

INDUSTRIAL APPLICABILITY

The present invention enables producing a solid product with a high purity, for example, polycrystalline silicon with a high purity at relatively inexpensive cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A production method for producing a solid product using a reaction of gaseous raw materials with a plurality of components, comprising a step of conducting the reaction using a vertical reactor disposed substantially in a vertical direction; a step of feeding the gaseous raw materials with a plurality of components from the upper part of the vertical reactor; a step of, in the lower part of the vertical reactor, forming a seal gas layer composed of a seal gas having a density equal to or more than the density of the following exhaust gas and fed continuously from the lower part of the vertical reactor; a step of, along the uppermost surface of the formed seal gas layer, discharging an exhaust gas containing a by-product gas generated by the reaction and unreacted gaseous raw materials from the vertical reactor; and a step of accommodating a solid product in the seal gas layer of the lower part.

2. The production method for producing a solid product of claim 1, wherein the seal gas layer has a linear velocity upward, and the linear velocity has a value equal to or more than the velocity that prevents the exhaust gas from diffusion into the seal gas layer.

3. The production method for producing a solid product of claim 1, wherein the seal gas layer has a temperature gradient that the temperature of the lower layer part is low and the temperature of the upper layer part is high.

4. The production method for producing a solid product of claim 1, wherein the seal gas is a gas having a density equal to or more than the highest density of the raw material gases although being less than the density of a solid product produced by the reaction.

5. The production method for producing a solid product of claim 1, wherein the gaseous raw materials with a plurality of components are a silicon chloride gas and a reducing agent gas, and the solid product is polycrystalline silicon.

6. The production method for producing a solid product of claim 5, wherein the seal gas is a silicon chloride gas.

7. The production method for producing a solid product of claim 6, wherein the vertical reactor has a heating means on the outer periphery surface, has a silicon chloride gas feeding nozzle fitted into the inside of the vertical reactor from the upper part of the vertical reactor and a reducing agent gas feeding nozzle fitted into the inside of the vertical reactor from the upper part of the vertical reactor, and has a crystal-growth point of polycrystalline silicon at the tip of the silicon chloride gas feeding nozzle.

8. The production method for producing a solid product of claim 7, wherein the polycrystalline silicon is grown downward in the vertical reactor.

9. The production method for producing a solid product of claim 8, wherein the polycrystalline silicon grown downward in the vertical reactor is dropped and accommodated in the seal gas layer formed in the lower part by an increase in its own weight accompanied with its growth or by an external physical means.

10. The production method for producing a solid product of claim 5, wherein, in the seal gas layer, a gas layer having a temperature gradient and a gas layer maintained at a substantially constant temperature that touches the gas layer having a temperature gradient on the upper surface thereof are formed.

11. The production method for producing a solid product of claim 5, wherein the polycrystalline silicon is accommodated in a gas layer maintained at a substantially constant temperature that is formed so as to touch a gas layer having a temperature gradient on the upper surface thereof.

12. The production method for producing a solid product of claim 5, wherein the silicon chloride gas is a silicon tetrachloride gas and the reducing agent gas is gaseous zinc.

13. The production method for producing a solid product of claim 12, wherein the seal gas layer formed by the silicon tetrachloride gas fed to the lower part of the vertical reactor has a linear velocity upward and the linear velocity is in the range of 4 to 100 mm/s.

* * * * *